United States Patent
Su et al.

(10) Patent No.: US 10,771,178 B2
(45) Date of Patent: Sep. 8, 2020

(54) METHOD FOR SENDING AND RECEIVING OPTICAL TRANSPORT NETWORK (OTN) SIGNAL, OTN DEVICE, AND SYSTEM

(71) Applicant: Huawei Technologies Co., Ltd., Shenzhen (CN)

(72) Inventors: Wei Su, Chengdu (CN); Maarten Petrus Joseph Vissers, Amsterdam (NL); Qiuyou Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 35 days.

(21) Appl. No.: 15/934,067

(22) Filed: Mar. 23, 2018

(65) Prior Publication Data

US 2018/0212696 A1 Jul. 26, 2018

Related U.S. Application Data

(63) Continuation of application No. PCT/CN2015/090613, filed on Sep. 24, 2015.

(51) Int. Cl.
*H04J 3/16* (2006.01)
*H04J 3/07* (2006.01)
*H04J 3/06* (2006.01)

(52) U.S. Cl.
CPC .......... *H04J 3/1658* (2013.01); *H04J 3/0658* (2013.01); *H04J 3/07* (2013.01); *H04J 3/1652* (2013.01)

(58) Field of Classification Search
CPC combination set(s) only.
See application file for complete search history.

(56) References Cited

U.S. PATENT DOCUMENTS

| | | | |
|---|---|---|---|
| 8,059,685 B2 | 11/2011 | Ghodrat et al. | |
| 9,647,788 B2* | 5/2017 | Walker | H04J 14/00 |
| 9,762,349 B1* | 9/2017 | Dai | H04J 14/026 |
| 10,079,641 B1* | 9/2018 | Chen | H04B 10/27 |
| 2007/0071033 A1 | 3/2007 | Surek et al. | |
| 2007/0248121 A1* | 10/2007 | Zou | H04J 3/1664 370/498 |
| 2008/0151941 A1 | 6/2008 | Ghodrat et al. | |
| 2012/0106956 A1* | 5/2012 | Rao | H04J 3/1652 398/52 |
| 2014/0161460 A1* | 6/2014 | Abbas | H04J 14/0257 398/79 |
| 2015/0249506 A1* | 9/2015 | Kitajima | H04J 3/1652 398/202 |
| 2016/0056914 A1* | 2/2016 | Gareau | H04J 3/1652 398/52 |

FOREIGN PATENT DOCUMENTS

| | | |
|---|---|---|
| CN | 101013961 A | 8/2007 |
| CN | 101499997 A | 8/2009 |
| CN | 101674218 A | 3/2010 |
| CN | 101695144 A | 4/2010 |
| CN | 101873517 A | 10/2010 |

\* cited by examiner

*Primary Examiner* — Fahmida S Chowdhury
(74) *Attorney, Agent, or Firm* — Slater Matsil, LLP

(57) ABSTRACT

Embodiments provide a method for sending an optical transport network (OTN) signal, including: acquiring, by a network element (an OTN device), a first OTN signal, and determining a to-be-deleted timeslot in the first OTN signal; deleting the to-be-deleted timeslot in the first OTN signal, to form a second OTN signal; and sending the second OTN signal by using an optical module, where a transmission rate of the second OTN signal adapts to a transmission rate of the optical module.

18 Claims, 11 Drawing Sheets

| | | | | | | | |
|---|---|---|---|---|---|---|---|
| 239 | | | | | | | TS#A.20 |
| 24~238 | | | | | | | ... |
| 23 | | | | | | | TS#A.4 |
| 22 | | | | | | | TS#A.3 |
| 21 | | | | | | | TS#A.2 |
| 4~20 | | | | | | | ... |
| 3 | | | | | | | TS#A.4 |
| 2 | | | | | | | TS#A.3 |
| 1 | | | | | | | |
| 239 | | | | | | | TS#A.2 |
| 24~238 | | | | | | | ... |
| 23 | | | | | | | TS#A.6 |
| 22 | | | | | | | TS#A.5 |
| 21 | | | | | | | TS#A.4 |
| 4~20 | | | | | | | ... |
| 3 | | | | | | | TS#A.6 |
| 2 | | | | | | | TS#A.5 |
| 1 | | | | | | | |
| 239 | | | | | | | TS#A.4 |
| 24~238 | | | | | | | ... |
| 23 | | | | | | | TS#A.8 |
| 22 | | | | | | | TS#A.7 |
| 21 | | | | | | | TS#A.6 |
| 4~20 | | | | | | | ... |
| 3 | | | | | | | TS#A.8 |
| 2 | | | | | | | TS#A.7 |
| 1 | | | | | | | |
| 239 | | | | | | | TS#A.6 |
| 24~238 | | | | | | | ... |
| 23 | | | | | | | TS#A.10 |
| 22 | | | | | | | TS#A.9 |
| 21 | | | | | | | TS#A.8 |
| 4~20 | | | | | | | ... |

CONT. FROM FIG. 5A

| | | | | | | | | |
|---|---|---|---|---|---|---|---|---|
| 3 | | | | | | | | TS#A.10 |
| 2 | | | | | | | | TS#A.9 |
| 1 | | | | | | | | |
| 239 | | | | | | | | TS#A.8 |
| 24~238 | | | | | | | | ... |
| 23 | | | | | | | | TS#A.12 |
| 22 | | | | | | | | TS#A.11 |
| 21 | | | | | | | | TS#A.10 |
| 4~20 | | | | | | | | ... |
| 3 | | | | | | | | TS#A.12 |
| 2 | | | | | | | | TS#A.11 |
| 1 | | | | | | | | |
| 239 | | | | | | | | TS#A.10 |
| 24~238 | | | | | | | | ... |
| 23 | | | | | | | | TS#A.14 |
| 22 | | | | | | | | TS#A.13 |
| 21 | | | | | | | | TS#A.12 |
| 4~20 | | | | | | | | ... |
| 3 | | | | | | | | TS#A.14 |
| 2 | | | | | | | | TS#A.13 |
| 1 | | | | | | | | |
| 239 | | | | | | | | TS#A.12 |
| 24~238 | | | | | | | | ... |
| 23 | | | | | | | | TS#A.16 |
| 22 | | | | | | | | TS#A.15 |
| 21 | | | | | | | | TS#A.14 |
| 4~20 | | | | | | | | ... |
| 3 | | | | | | | | TS#A.16 |
| 2 | | | | | | | | TS#A.15 |
| 1 | | | | | | | | |
| 239 | | | | | | | | TS#A.14 |
| 24~238 | | | | | | | | ... |

CONT. FROM FIG. 5B

FIG. 5C

METHOD FOR SENDING AND RECEIVING OPTICAL TRANSPORT NETWORK (OTN) SIGNAL, OTN DEVICE, AND SYSTEM

CROSS-REFERENCE TO RELATED APPLICATIONS

This application is a continuation of International Application No. PCT/CN2015/090613, filed on Sep. 24, 2015. The disclosure of the aforementioned application is hereby incorporated by reference in its entirety.

TECHNICAL FIELD

The present disclosure relates to the communications field, and in particular, to a method for sending and receiving an optical transport network (OTN) signal, an OTN device, and a system.

BACKGROUND

Currently, an Optical Transport Network (OTN), as a core technology of a transport network, includes electrical and optical technical specifications, has abundant Operation, Administration and Maintenance (OAM), a strong Tandem Connection Monitoring (TCM) capability, and an out-of-band Forward Error Correction (FEC) capability, and can implement flexible scheduling of and management on high-capacity services.

With an increase in service traffic and diversified development of services, in comparison with an interface having a fixed rate provided by a conventional OTN, the industry is more inclined to provide an OTN interface having a multi-granularity level rate. Currently, the International Telecommunication Union-Telecommunication Standardization Sector (ITU-T) standards organization is formulating an Optical Channel Transport Unit-Cn (OTUCn) (C is the Roman numeral for 100, and n is a positive integer) interface for an application on a more than 100 Gbit/s OTN. The OTUCn interface provides a capability of processing an electrical interface having a rate of n*100 Gbit/s, and an OTUCn signal includes 20*n 5-Gbit/s timeslots.

A frame structure of an OTUCn frame defined in an OTUCn signal is shown in FIG. 1, the OTUCn frame includes n OTU subframes, and each OTU subframe has 4 rows and 3824 columns. A Frame Alignment Overhead (FA OH) is a frame alignment overhead byte, and provides a function of frame synchronization. An OTU OH is an OTUCn overhead byte, uses the OTUCn as a signal, manages and monitors the signal, and provides a network management function at a level of an optical channel transport unit. Majority of overhead information in OTUCn overheads is carried by using an OTU OH of an OTU subframe (OTU subframe #1) carried by a first lane, and remaining minority of overhead information is carried by using remaining OTU subframes carried by multiple lanes. The OTUCn frame is formed after the FA OH and OTUCn overheads are added to an Optical Channel Data Unit-Cn (ODUCn) frame. The ODUCn frame includes n ODU subframes, and each ODU subframe has 4 rows and 3824 columns. The ODUCn frame is formed after ODUCn overheads are added to an Optical Channel Payload Unit-Cn (OPUCn) frame. The OPUCn frame includes n OPU subframes, and each OPU subframe has 4 rows and 3810 columns. Each OPU subframe includes 2 columns of overhead areas and 3808 columns of payload areas, and each OPU subframe includes 20 5-Gbit/s timeslots, which are used to carry low-order services. Before the OTUCn frame is sent, single-byte or multi-byte interleaving processing is performed on the n OTU subframes of the OTUCn frame based on a type of a physical interface that is to be used for transmission, for example, single-byte or 16-byte interleaving processing is performed, to form a serial OTUCn bit data stream, and the serial OTUCn bit data stream is sent by using an optical module having a corresponding rate.

In a current system, an OTUCn interface provides a capability of processing an electrical interface having a rate of n*100 Gbit/s, and therefore can adapt to an optical module having a rate that is an integer multiple of 100 Gbit/s. Actually, in an actual application, optical modules whose rates, such as 150 Gbit/s and 250 Gbit/s, are not an integer multiple of 100 Gbit/s exist on a network. An OTUCn signal cannot adapt to an optical module whose rate is not an integer multiple of 100 Gbit/s. For example, in FIG. 2, when an OTU4 (having a rate of 100 Gbit/s) signal is sent or received by using an optical module having a rate of 150 Gbit/s, a problem of a waste of bandwidth exists; when an OTUC2 (having a rate of 200 Gbit/s) signal is sent or received by using an optical module having a rate of 150 Gbit/s, a problem that adaptation or transport cannot be performed exists. Therefore, in the current system, a problem that a rate of an OTN signal does not adapt to a rate of an optical module exists.

SUMMARY

In view of this, embodiments of the present disclosure provide a method for sending and receiving an optical transport network (OTN) signal, an OTN device, and a system, which can resolve a problem that a rate of an OTN signal does not adapt to a rate of an optical module.

According to a first aspect, an embodiment of the present disclosure provides a method for sending an optical transport network (OTN) signal. The method includes acquiring, by an OTN device, a first OTN signal, and determining a to-be-deleted timeslot in the first OTN signal; deleting the to-be-deleted timeslot in the first OTN signal, to form a second OTN signal. The method also includes sending the second OTN signal by using an optical module, where a transmission rate of the second OTN signal adapts to a transmission rate of the optical module. The second OTN signal is constructed based on a timeslot granularity, which has high flexibility. The second OTN signal is constructed by using the first OTN signal, so that the transmission rate of the second OTN signal adapts to the transmission rate of the optical module.

With reference to the first aspect, in a first possible implementation manner of the first aspect, after the determining a to-be-deleted timeslot in the first OTN signal, the method further includes: adding a timeslot deletion identifier to the first OTN signal, where the timeslot deletion identifier indicates the to-be-deleted timeslot in the first OTN signal. The to-be-deleted timeslot may be an unavailable timeslot in a system, such as an idle timeslot or a reserved timeslot. Specifically, the timeslot deletion identifier may be added to overheads corresponding to the to-be-deleted timeslot of the first OTN signal. Adding the timeslot deletion identifier to the first OTN signal provides a timeslot deletion basis for construction of the second OTN signal.

With reference to the first aspect or the first possible implementation manner of the first aspect, in a second possible implementation manner of the first aspect, the determining a to-be-deleted timeslot in the first OTN signal specifically includes: receiving first timeslot configuration information from a network management system, where the first timeslot configuration information indicates the to-be-deleted timeslot in the first OTN signal; and determining the to-be-deleted timeslot in the first OTN signal according to the first timeslot configuration information.

With reference to any one of the first aspect or the first and the second possible implementation manners of the first aspect, in a third possible implementation manner of the first aspect, the determining a to-be-deleted timeslot in the first OTN signal specifically includes: determining the to-be-deleted timeslot in the first OTN signal according to a preset policy, where the preset policy may be an idle timeslot or a reserved timeslot that is set by a system.

With reference to any one of the first aspect, the first possible implementation manner of the first aspect, the second possible implementation manner of the first aspect, or the third possible implementation manner of the first aspect, in a fourth possible implementation manner of the first aspect, after the adding a timeslot deletion identifier to the first OTN signal, the method includes: generating timeslot deletion identifier information according to the to-be-deleted timeslot in the first OTN signal, where the timeslot deletion identifier information indicates the to-be-deleted timeslot in the first OTN signal; and sending the timeslot deletion identifier information to a network management system.

With reference to any one of the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, before the deleting the to-be-deleted timeslot in the first OTN signal, the method further includes: receiving second timeslot configuration information from the network management system, where the second timeslot configuration information indicates the to-be-deleted timeslot in the first OTN signal; and the deleting the to-be-deleted timeslot in the first OTN signal specifically includes: verifying the second timeslot configuration information and the timeslot deletion identifier, and when a verification result is that the second timeslot configuration information is consistent with the timeslot deletion identifier, deleting the to-be-deleted timeslot in the first OTN signal. Before the to-be-deleted timeslot is deleted, the timeslot deletion identifier and the second timeslot configuration information are verified, which can ensure accuracy of timeslot deletion.

With reference to any one of the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the first OTN signal is any one of an OTUCn signal, an ODUCn signal, or an OPUCn signal, and the second OTN signal is an OTUCn-M signal, where C denotes the Roman numeral for 100, n is a positive integer, and M is a quantity of timeslots in the OTUCn-M signal.

According to a second aspect, an embodiment of the present disclosure provides a method for receiving an optical transport network (OTN) signal. The method includes receiving, by an OTN device, a second OTN signal by using an optical module, and determining an already deleted timeslot in the second OTN signal, where a transmission rate of the second OTN signal adapts to a transmission rate of the optical module; stuffing the already deleted timeslot in the second OTN signal with bits, to restore the second OTN signal to a first OTN signal; and demapping the first OTN signal, to obtain a client signal. The second OTN signal is received by using the optical module, wherein the transmission rate of the second OTN signal adapts to the transmission rate of the optical module. The first OTN signal is restored from the second OTN signal, and a framing processing chip does not need to be re-designed, which has low implementation complexity.

With reference to the second aspect, in a first possible implementation manner of the second aspect, the determining an already deleted timeslot in the second OTN signal specifically includes: acquiring a timeslot deletion identifier from the second OTN signal, where the timeslot deletion identifier indicates the already deleted timeslot in the second OTN signal; and determining the already deleted timeslot in the second OTN signal according to the timeslot deletion identifier. The already deleted timeslot may be an unavailable timeslot in a system, such as an idle timeslot or a reserved timeslot. Specifically, the timeslot deletion identifier may be carried in overheads corresponding to the already deleted timeslot in the second OTN signal. Which timeslots are already deleted timeslots may be determined according to timeslot deletion identifiers.

With reference to the second aspect or the first possible implementation manner of the second aspect, in a second possible implementation manner of the second aspect, before the stuffing the already deleted timeslot in the second OTN signal with bits, the method further includes: receiving second timeslot configuration information from a network management system, where the second timeslot configuration information indicates the already deleted timeslot in the second OTN signal; and the stuffing the already deleted timeslot in the second OTN signal with bits, to restore the second OTN signal to a first OTN signal specifically includes: verifying the second timeslot configuration information and the timeslot deletion identifier, and when a verification result is that the second timeslot configuration information is consistent with the timeslot deletion identifier, stuffing the already deleted timeslot in the second OTN signal with bits. Before the already deleted timeslot is stuffed with bits, the second timeslot configuration information and the timeslot deletion identifier are verified, which can ensure accuracy of data recovery.

With reference to any one of the second aspect, or the first and the second possible implementation manners of the second aspect, in a third possible implementation manner of the second aspect, the determining an already deleted timeslot in the second OTN signal specifically includes: receiving first timeslot configuration information from a network management system, where the first timeslot configuration information indicates the already deleted timeslot in the second OTN signal; and determining the already deleted timeslot in the second OTN signal according to the first timeslot configuration information.

With reference to any one of the second aspect, the first possible implementation manner of the second aspect, the second possible implementation manner of the second aspect, or the third possible implementation manner of the second aspect, in a fourth possible implementation manner of the second aspect, the demapping the first OTN signal, to obtain a client signal specifically includes: demapping timeslots in the first OTN signal except the already deleted timeslot, to obtain the client signal.

With reference to any one of the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the second OTN signal is an OTUCn-M signal, and the first OTN signal is any one of an OTUCn signal, an ODUCn signal, or an OPUCn signal, where C denotes the Roman numeral for 100, n is a positive integer, and M is a quantity of timeslots in the OTUCn-M signal.

According to a third aspect, an embodiment of the present disclosure provides an optical transport network (OTN) device. The OTN device includes an acquiring module, configured to acquire a first OTN signal. The OTN also device includes a determining module, configured to determine a to-be-deleted timeslot in the first OTN signal. The OTN device further includes a deletion module, configured to delete the to-be-deleted timeslot in the first OTN signal, to form a second OTN signal. The OTN device also includes a sending module, configured to send the second OTN signal by using an optical module, where a transmission rate of the second OTN signal adapts to a transmission rate of the optical module.

With reference to the third aspect, in a first possible implementation manner of the third aspect, the OTN device further includes an addition module, where the addition module is configured to add a timeslot deletion identifier to the first OTN signal, where the timeslot deletion identifier indicates the to-be-deleted timeslot in the first OTN signal.

With reference to the third aspect or the first possible implementation manner of the third aspect, in a second possible implementation manner of the third aspect, the determining module is specifically configured to: receive first timeslot configuration information from a network management system, where the first timeslot configuration information indicates the to-be-deleted timeslot in the first OTN signal; and determine the to-be-deleted timeslot in the first OTN signal according to the first timeslot configuration information.

With reference to any one of the third aspect, or the first and the second possible implementation manners of the third aspect, in a third possible implementation manner of the third aspect, the determining module is specifically configured to determine the to-be-deleted timeslot in the first OTN signal according to a preset policy.

With reference to any one of the third aspect, the first possible implementation manner of the third aspect, the second possible implementation manner of the third aspect, or the third possible implementation manner of the third aspect, in a fourth possible implementation manner of the third aspect, the OTN device further includes: a timeslot deletion identifier information generation unit, where the timeslot deletion identifier information generation unit is configured to: generate timeslot deletion identifier information according to the to-be-deleted timeslot in the first OTN signal, where the timeslot deletion identifier information indicates the to-be-deleted timeslot in the first OTN signal; and send the timeslot deletion identifier information to a network management system.

With reference to any one of the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the OTN device further includes a verification module, where the verification module is configured to: receive second timeslot configuration information from the network management system, where the second timeslot configuration information indicates the to-be-deleted timeslot in the first OTN signal; and verify the second timeslot configuration information and the timeslot deletion identifier, and when a verification result is that the second timeslot configuration information is consistent with the timeslot deletion identifier, delete the to-be-deleted timeslot in the first OTN signal.

With reference to any one of the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner of the third aspect, the first OTN signal is any one of an OTUCn signal, an ODUCn signal, or an OPUCn signal, and the second OTN signal is an OTUCn-M signal, where C denotes the Roman numeral for 100, n is a positive integer, and M is a quantity of timeslots in the OTUCn-M signal.

According to a fourth aspect, an embodiment of the present disclosure provides an OTN device for receiving an optical transport network signal. The OTN device includes: a receiving module, configured to receive a second OTN signal by using an optical module, where a transmission rate of the second OTN signal adapts to a transmission rate of the optical module. The OTN device also includes a determining module, configured to determine an already deleted timeslot in the second OTN signal. The OTN device also includes a restoration module, configured to stuff the already deleted timeslot in the second OTN signal with bits, to restore the second OTN signal to a first OTN signal. The OTN device also includes a demapping module, configured to demap the first OTN signal, to obtain a client signal.

With reference to the fourth aspect, in a first possible implementation manner of the fourth aspect, the determining module is specifically configured to: acquire a timeslot deletion identifier from the second OTN signal, where the timeslot deletion identifier indicates the already deleted timeslot in the second OTN signal; and determine the already deleted timeslot in the second OTN signal according to the timeslot deletion identifier.

With reference to the fourth aspect or the first possible implementation manner of the fourth aspect, in a second possible implementation manner of the fourth aspect, the OTN device further includes a verification module, where the verification module is configured to: receive second timeslot configuration information from a network management system, where the second timeslot configuration information indicates the already deleted timeslot in the second OTN signal; and verify the second timeslot configuration information and the timeslot deletion identifier, and when a verification result is that the second timeslot configuration information is consistent with the timeslot deletion identifier, stuff the already deleted timeslot in the second OTN signal with bits.

With reference to any one of the fourth aspect, or the first and the second possible implementation manners of the fourth aspect, in a third possible implementation manner of the fourth aspect, the determining module is specifically configured to: receive first timeslot configuration information from a network management system, where the first timeslot configuration information indicates the already deleted timeslot in the second OTN signal; and determine the already deleted timeslot in the second OTN signal according to the first timeslot configuration information.

With reference to any one of the fourth aspect, the first possible implementation manner of the fourth aspect, the second possible implementation manner of the fourth aspect, or the third possible implementation manner of the fourth aspect, in a fourth possible implementation manner of the fourth aspect, the demapping module is specifically configured to demap timeslots in the first OTN signal except the already deleted timeslot, to obtain the client signal.

With reference to any one of the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner of the fourth aspect, the second OTN signal is an OTUCn-M signal, and the first OTN signal is any one of an OTUCn signal, an ODUCn signal, or an OPUCn signal, where C denotes the Roman numeral for 100, n is a positive integer, and M is a quantity of timeslots in the OTUCn-M signal.

According to a fifth aspect, an embodiment of the present disclosure provides a system for sending and receiving an optical transport network (OTN) signal. The system includes a first OTN device and a second OTN device. The first OTN device is configured to: acquire a first OTN signal, and determine a to-be-deleted timeslot in the first OTN signal; delete the to-be-deleted timeslot in the first OTN signal, to form a second OTN signal; and send the second OTN signal by using an optical module of the first OTN device, where a transmission rate of the second OTN signal adapts to a transmission rate of the optical module of the first OTN device. The second OTN device is configured to: receive a second OTN signal by using an optical module of the second OTN device, and determine an already deleted timeslot in the second OTN signal, where a transmission rate of the second OTN signal adapts to a transmission rate of the optical module of the second OTN device; stuff the already deleted timeslot in the second OTN signal with bits, to restore the second OTN signal to a first OTN signal; and demap the first OTN signal, to obtain a client signal.

According to a sixth aspect, an embodiment of the present disclosure provides a system for sending and receiving an optical transport network (OTN) signal. The system includes a first OTN device, a second OTN device, and a third OTN device. The third OTN device is an intermediate node between the first OTN device and the second OTN device. The first OTN device is configured to: acquire a first OTN signal, and determine a to-be-deleted timeslot in the first OTN signal; and send the first OTN signal to the third OTN device. The third OTN device is configured to: receive the first OTN signal, and delete the to-be-deleted timeslot in the first OTN signal, to form a second OTN signal; and send the second OTN signal by using an optical module of the third OTN device, where a transmission rate of the second OTN signal adapts to a transmission rate of the optical module of the third OTN device. The second OTN device is configured to: receive the second OTN signal by using an optical module of the second OTN device, and determine an already deleted timeslot in the second OTN signal, where a transmission rate of the second OTN signal adapts to a transmission rate of the optical module of the second OTN device; stuff the already deleted timeslot in the second OTN signal with bits, to restore the second OTN signal to a first OTN signal; and demap the first OTN signal, to obtain a client signal.

According to a seventh aspect, an embodiment of the present disclosure provides an OTN device, including: a framing processing module, an ODSP chip, and an optical module. The framing processing module is configured to generate an OTN signal. The ODSP chip is configured to perform modulation processing on the OTN signal generated by the framing processing module. The optical module is configured to: perform optical-to-electrical conversion on the OTN signal on which the ODSP chip has performed modulation processing, and send the OTN signal. The OTN device may perform the method according to the first aspect or any possible implementation manner of the first aspect.

According to an eighth aspect, an embodiment of the present disclosure provides an OTN device, including: a framing processing module, an ODSP chip, and an optical module. The optical module is configured to perform optical-to-electrical conversion on a received OTN signal. The ODSP chip is configured to perform demodulation processing on the OTN signal on which the optical module has performed optical-to-electrical conversion. The framing processing module is configured to demap the OTN signal on which the ODSP chip has performed demodulation processing. The OTN device may perform the method according to the second aspect or any possible implementation manner of the second aspect.

The technical solutions provided in the embodiments of the present disclosure may be applied to an application scenario in which a transmission rate of an OTN signal does not adapt to a transmission rate of an optical module that transmits the OTN signal.

In a sending device, a to-be-deleted timeslot may be deleted from a first OTN signal (for example, an OTUCn signal), to construct a second OTN signal (for example, an OTUCn-M signal). The second OTN signal is constructed based on a timeslot granularity, which has high flexibility. A transmission rate of the second OTN signal adapts to a transmission rate of an optical module. Therefore, the second OTN signal may be sent by using the optical module. The second OTN signal whose rate adapts to the rate of the optical module is constructed, resolving a problem that a rate of an OTN signal does not adapt to a rate of an optical module.

In a receiving device, a transmission rate of a second OTN signal adapts to a transmission rate of an optical module. Therefore, a second OTN signal may be received by using the optical module. An already deleted timeslot in the second OTN signal is stuffed with bits, to restore the second OTN signal to a first OTN signal. The first OTN signal is demapped, to obtain a client signal. In the receiving device, the first OTN signal is restored from the second OTN signal, and a framing processing chip does not need to be re-designed, which has low implementation complexity. In addition, a problem that a rate of an OTN signal does not adapt to a rate of an optical module is resolved.

BRIEF DESCRIPTION OF THE DRAWINGS

To describe the technical solutions in the embodiments of the present disclosure more clearly, the following briefly introduces the accompanying drawings required for describing the background and the embodiments. Apparently, what are described in the following accompanying drawings are only some embodiments of the present disclosure, and a person of ordinary skill in the art may obtain other drawings or embodiments according to these accompanying drawings and descriptions without creative efforts. The present disclosure is intended to cover all the derived drawings or embodiments.

FIG. 5A, FIG. 5B and FIG. 5C show a part of a frame structure of an OTUCn-M frame according to an embodiment of the present disclosure;

DETAILED DESCRIPTION OF ILLUSTRATIVE EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
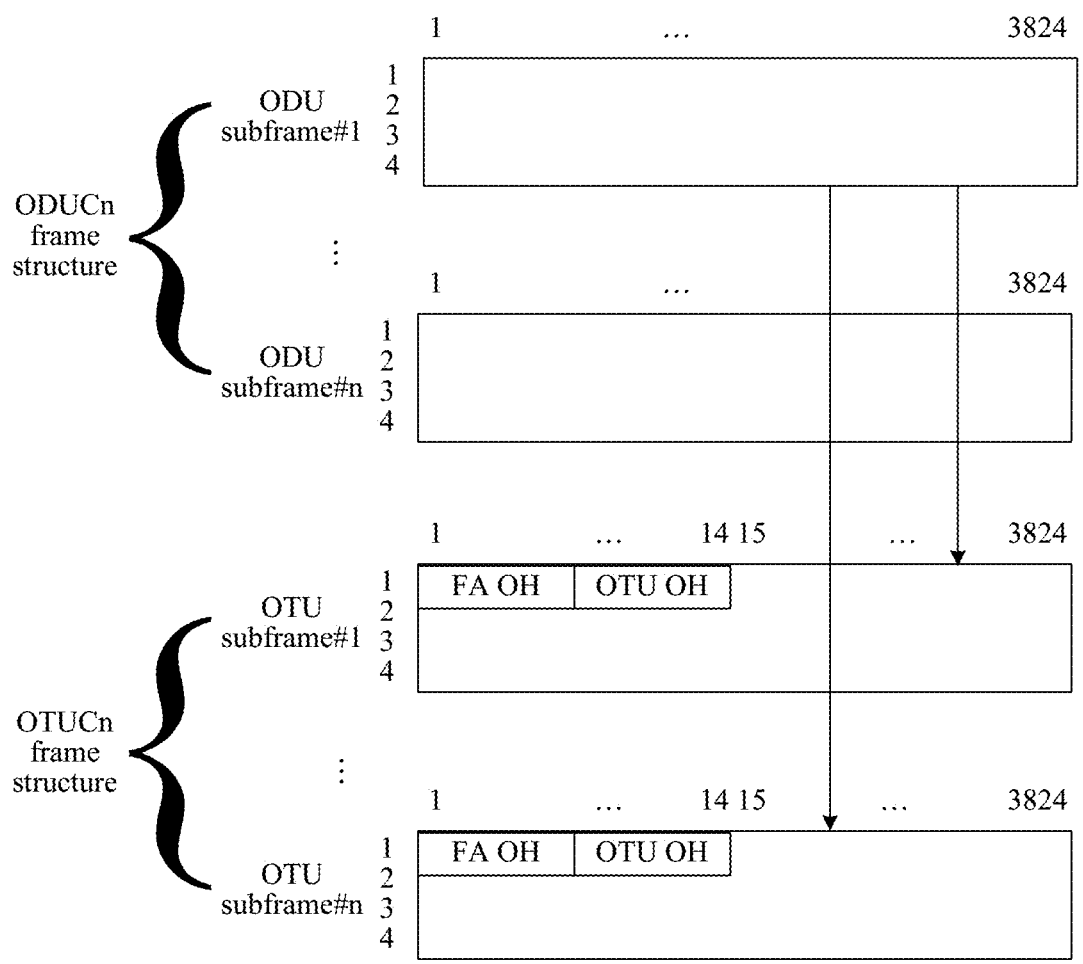
FIG. 1 is a schematic diagram of structures of an ODUCn frame and an OTUCn frame in the prior art.
Figure 2:
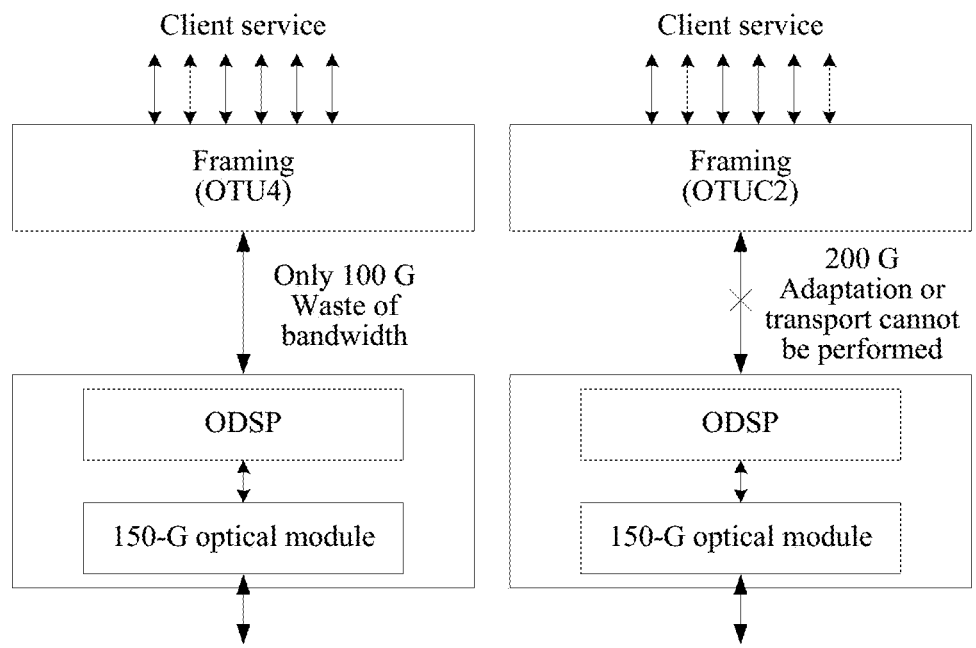
FIG. 2 is a schematic diagram of a process for transmitting a client signal in the prior art.
Figure 3:
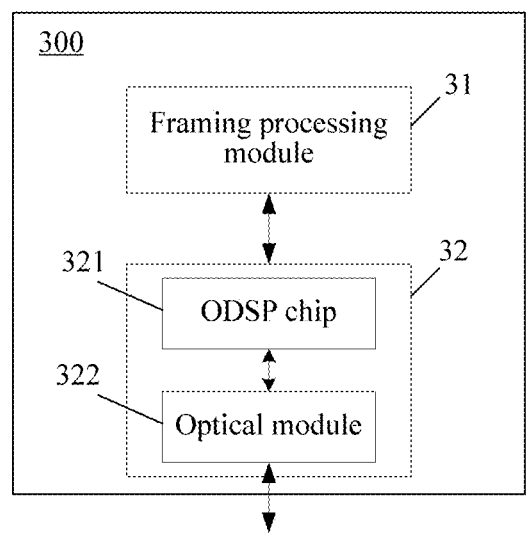
FIG. 3 is a schematic structural diagram of a transport device 300 according to an embodiment of the present disclosure.

FIG. 3 is a schematic structural diagram of a transport device 300 according to an embodiment of the present disclosure. As shown in FIG. 3, the transport device 300 may be an Sub-Wavelength Cross Connector (SWXC). The SWXC has a sub-wavelength cross function, and can switch sub-wavelengths on different optical paths, that is, has a small granularity cross function at an electrical layer of an OTN. The so-called cross refers to that signals are switched between different paths. Specifically, the SWXC may map crossed client signals, encapsulate the client signals into OTU signals, and send the OTU signals to a fiber channel. Alternatively, the SWXC may terminate an OPU signal, an ODU signal, an OTU signal, and the like, that is, obtain client signals by demapping these signals, then cross the client signals, and transport the crossed client signals by using a path selected after crossing.

The transport device 300 may include a framing processing module 31 and an optical processing module 32. The optical processing module 32 includes an Optical Digital Signal Processor (ODSP) chip 321 and an optical module 322. Specifically, the ODSP chip 321 may be an independent function module, or may be integrated into the optical module 322. Specifically, the framing processing module 31 may be a chip configured to implement data framing. The framing processing module 31 may map a client signal, encapsulate the client signal into an OTN bearer signal (for example, an ODU), and add an OTU overhead byte and an FA overhead byte, to construct an OTU signal. The framing processing module 31 may further obtain a client signal by demapping an OTU signal received by the optical module 322. The ODSP chip 321 is configured to perform modulation and demodulation processing on a signal sent by the framing processing module 31 or a signal received from the optical module 322, and is configured to perform related processing, such as enhancing a line bit error tolerance capability. The optical module 322 is configured to perform optical-to-electrical conversion. Specifically, the optical module 322 may convert an electrical signal into an optical signal before an OTU signal is sent, and may convert the optical signal into the electrical signal after the OTU signal is received.

Figure 4:
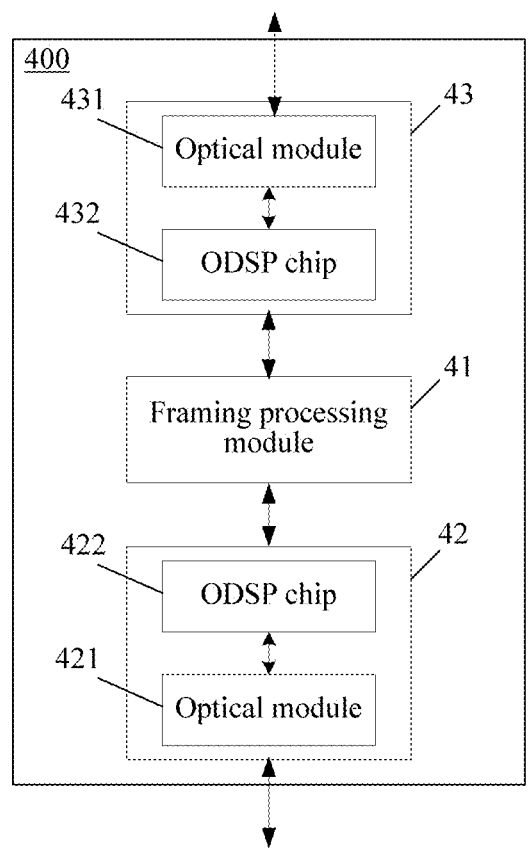
FIG. 4 is a schematic structural diagram of another transport device 400 according to an embodiment of the present disclosure.

FIG. 4 is a schematic structural diagram of another transport device 400 according to an embodiment of the present disclosure. As shown in FIG. 4, the transport device 400 may be a Wavelength Cross Connector (WXC) or a Reamplification, Reshaping and Retiming (3R) generator. The WXC or 3R generator has a wavelength cross function, can switch wavelengths on different optical paths, and can regenerate an electrical signal. That is, the WXC or 3R generator terminates a received OTU signal, parses out an ODU signal, and encapsulates the ODU signal into a regenerated OTU signal for sending.

Specifically, the transport device 400 includes a framing processing module 41 and an optical processing module 42/43. The transport device 400 may be an intermediate network element in a network, and therefore, has one more optical processing module than that of the transport device 300. Specifically, an optical module 431 or 421 may receive an OTU signal; after parsing out an ODU signal, the framing processing module 41 encapsulates the ODU signal into a regenerated OTU signal; the optical module 421 or 431 sends the regenerated OTU signal. Functions of the framing processing module 41, the optical processing module 42/43, the optical module 421/431, and an ODSP chip 422/432 in the transport device 400 are similar to functions of the framing processing module 31, the optical processing module 32, the optical module 322, and the ODSP chip 321 in the transport device 300, and are not described herein.

A conventional OTN signal includes an OTUk having four fixed rates, and when k=1, 2, 3, and 4, the OTUk separately corresponds to rate levels of 2.5 Gbit/s, 10 Gbit/s, 40 Gbit/s, and 100 Gbit/s. Currently, the ITU-T is formulating an OTUCn (n is a positive integer) signal that can provide a rate of n*100 Gbit/s. The OTUCn signal includes 20*n timeslots, and each timeslot has a rate of 5 Gbit/s. However, an optical module whose rate cannot match a rate of the OTN signal currently exists in a network. In an OTN device shown in FIG. 3 or FIG. 4, a case in which a rate of an OTN signal generated by a framing processing module does not adapt to a rate of an optical module, or a case in which a rate of an OTN signal received by an optical module does not adapt to a rate of an optical module exists in the prior art. For example, optical modules whose rates, such as 150 Gbit/s and 250 Gbit/s, are not an integer multiple of 100 Gbit/s cannot adapt to an OTUCn signal. This embodiment of the present disclosure resolves a problem that a rate of an OTN signal does not adapt to a rate of an optical module, and can be applied to processing of adaptation of an OTN signal having any rate to an optical module that transmits the OTN signal and whose rate does not match the rate of the OTN signal. For example, an OTUCn signal whose rate is an integer multiple of 100 Gbit/s and an OTN signal (an OTUk signal) having another rate are included. According to this embodiment of the present disclosure, an OTUCn signal (for example, an OTUC2 signal) can adapt to an optical module whose rate is not an integer multiple of 100 Gbit/s (for example, 150 Gbit/s), and an OTN signal (for example, an OTU4 signal) having another rate can further adapt to an optical module that transmits the OTN signal and whose rate (for example, 75 Gbit/s) does not match the rate of the OTN signal. In this embodiment of the present disclosure, the OTUCn signal is mainly used an example for description.

In this embodiment of the present disclosure, an OTN device deletes an unavailable timeslot from all timeslots in an OTUCn frame, so as to construct an OTUCn-M (M is a positive integer, and M is less than 20*n) frame. The unavailable timeslot may be an idle timeslot, a reserved timeslot that is set by a system, or the like. Which timeslots are unavailable timeslots may be indicated according to timeslot configuration information of a network management system, and the OTN device determines the unavailable timeslot according to the timeslot configuration information of the network management system. Alternatively, the OTN device determines, according to a preset policy, which timeslots are unavailable timeslots, and reports information about which timeslots are unavailable timeslots to a network management system. An OTUCn-M frame includes M timeslots, and each timeslot has a rate of 5 Gbit/s, where the M timeslots are available timeslots in the OTUCn frame. For example, in the OTN device, when an OTUC2 signal generated by a framing processing module is sent by using an optical module having a rate of 150 Gbit/s, an OTUC2 needs to be converted into an OTUC2-30. That is, 10 unavailable timeslots of 40 timeslots of the OTUC2 are deleted, to construct an OTUC2-30 having a rate of 30 timeslots*5 Gbit/s.

Figure 5C:
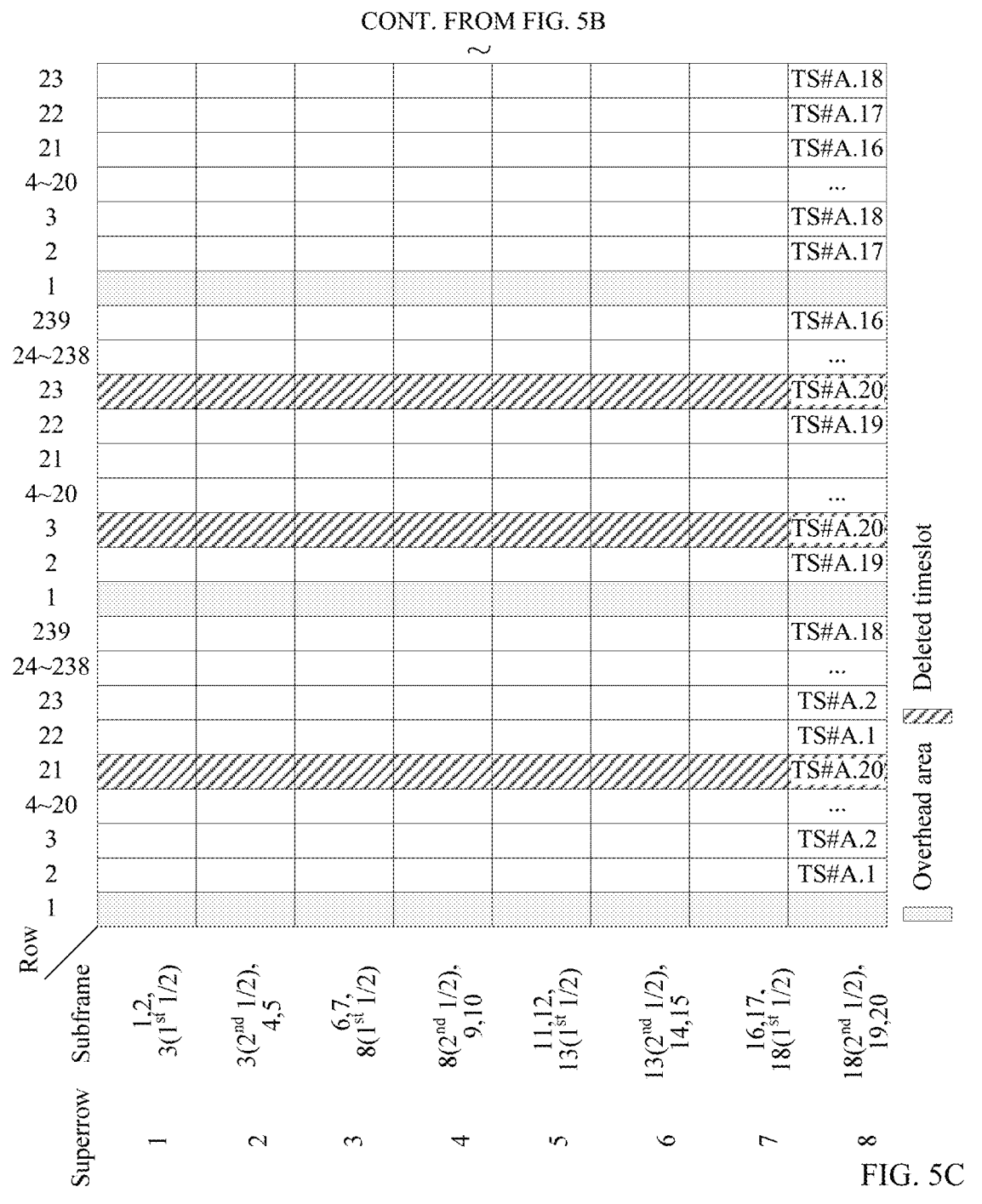

FIG. 5A, FIG. 5B and FIG. 5C show a part of a frame structure of an OTUCn-M frame according to an embodiment of the present disclosure. It may be considered that the OTUCn frame is constructed by n OTUC # A (A ranges from 1 to n) multiframes, and each OTUC # A multiframe may include 20 OTUC # A subframes. One OTUC # A subframe may have 4 rows*3824 columns. M available timeslots are selected from the OTUCn frame to construct the OTUCn-M frame that is in a new frame structure pattern rearranged in a unit of the OTUC # A subframe of the OTUCn frame. Specifically, every 2.5 OTUC # A subframes have 2.5 4 rows*3824 columns in total, and 1 superrow*2390 columns is constructed. In this way, 20 OTUC # A subframes construct 8 superrows*2390 columns, and there are 16 bytes in each column. In FIG. 5A, FIG. 5B and FIG. 5C, gray parts are overhead areas, and remaining parts are payload areas. Payload areas of an OTUCn frame are successively divided into 20 timeslots in a unit of a column: a TS # A.1, a TS # A.2, . . . , and a TS # A.20. An area of the TS # A.20 is identified by using a slash shadow, indicating that the TS # A.20 is a deleted timeslot in the OTUCn frame constructing an OTUCn-M frame, and may be, for example, an unavailable timeslot, that is, the OTUCn-M frame does not include the TS # A.20 timeslot. The OTUCn-M frame includes 8 superrows*(10*n+119*M) columns, where the 10*n columns are overhead areas that are in the OTUCn frame constructing the OTUCn-M frame, and the 119*M columns are available timeslot areas that are in the OTUCn frame constructing the OTUCn-M frame. FIG. 5A, FIG. 5B and FIG. 5C show only a part of a frame structure of an OTUCn-M frame including 20 OTUC # A subframes. Actually, a complete OTUCn-M frame may include 20*n OTUC # A subframes. (20*n-M) timeslots are deleted from the OTUCn frame, and remaining M timeslots construct the OTUCn-M frame.

Figures 6, 7:
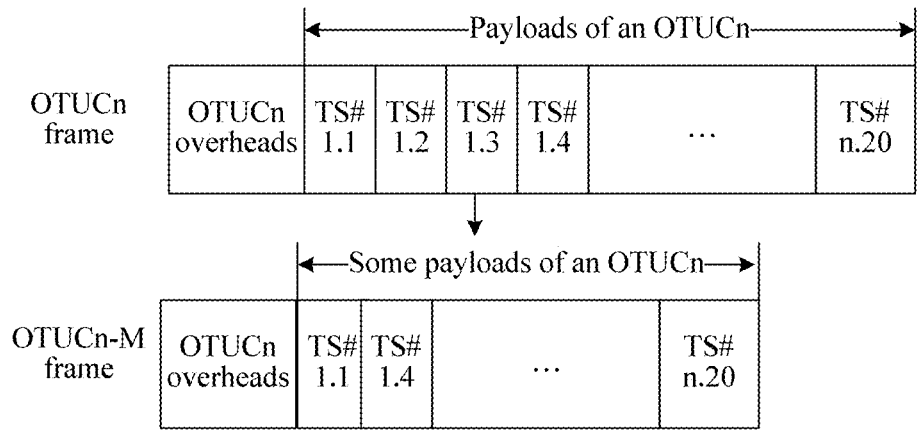
FIG. 6 is a schematic diagram of converting an OTUCn frame into an OTUCn-M frame according to an embodiment of the present disclosure.
FIG. 7 is a schematic structural diagram of timeslot availability overheads according to an embodiment of the present disclosure.

FIG. 6 is a schematic diagram of converting an OTUCn frame into an OTUCn-M frame according to an embodiment of the present disclosure. As shown in FIG. 6, (20*n-M) timeslots, such as a TS #1.2 timeslot and a TS #1.3 timeslot, in the OTUCn frame may be deleted, and overhead areas and remaining timeslots in the OTUCn frame construct the OTUCn-M frame, where M denotes a quantity of timeslots in the OTUCn-M frame.

It should be noted that the foregoing embodiment is only a manner for dividing a frame structure pattern of an OTUCn-M frame, and a division manner of the frame structure pattern is not limited thereto. For example, besides performing division by using a 5-Gbit/s timeslot granularity, division may further be performed by using another timeslot granularity.

A bit rate of the OTUCn-M frame is: (10n+119*M)/(10n+119*20*n)*bit rate of an OTUCn frame constructing the OTUCn-M frame, where (10n+119*M) is a quantity of columns in the OTUCn-M frame, (10n+119*20*n) is a quantity of columns in the OTUCn frame constructing the OTUCn-M frame, and the bit rate of the OTUCn frame constructing the OTUCn-M frame is (n*239/226*99 532 800) kbit/s. Details are shown in Table 1:

TABLE 1

| Bit rate of an OTUCn-M frame | | |
|---|---|---|
| Type of an OTU | Normal rate of the OTU | Frequency offset |
| OTUCn-M | (10n + 119 * M)/(10n + 119 * 20 * n) * (n × 239/226 × 99 532 800) kbit/s | ±20 ppm |

Notes:
a normal bit rate of an OTUCn-M frame is (10n + 119 * M)/2390 * 105 258 138.053 kbit/s.

FIG. 7 is a schematic structural diagram of timeslot availability overheads according to an embodiment of the present disclosure. An available timeslot and an unavailable timeslot that are in an OTUCn frame are identified by using "Availability" bits. The available timeslot is reserved and the unavailable timeslot is deleted according to the "Availability" bits, so as to construct an OTUCn-M frame.

Specifically, a Multiplex Structure Identifier (MSI) of an OPUCn frame may be used as timeslot availability overheads. A one-bit "Availability" field in the MSI is allocated to each timeslot, and is used to indicate that the timeslot is available or unavailable. It may be considered that the OPUCn frame includes n OPUC # A multiframes, and each OPUC # A multiframe includes 20 OPUC # A subframes, that is, an OPUC # A subframe is in a one-to-one correspondence with an OTUC # A subframe. In the OTUCn-M frame structure shown in FIG. 5A, FIG. 5B and FIG. 5C, 20 OPUC # A subframes are divided into 20 timeslots, which are respectively a TS # A.1, a TS # A.2, ..., and a TS # A.20. Each timeslot corresponds to 2 Payload Structure Identifier (PSI) bytes. For the first bit of a PSI[A.2], PSI[A.4], ..., and a PSI[A.40], one bit of timeslot availability overheads is separately allocated to the TS # A.1, TS # A.2, ..., and TS # A.20, and is specifically an "Availability" field.

Figure 8:
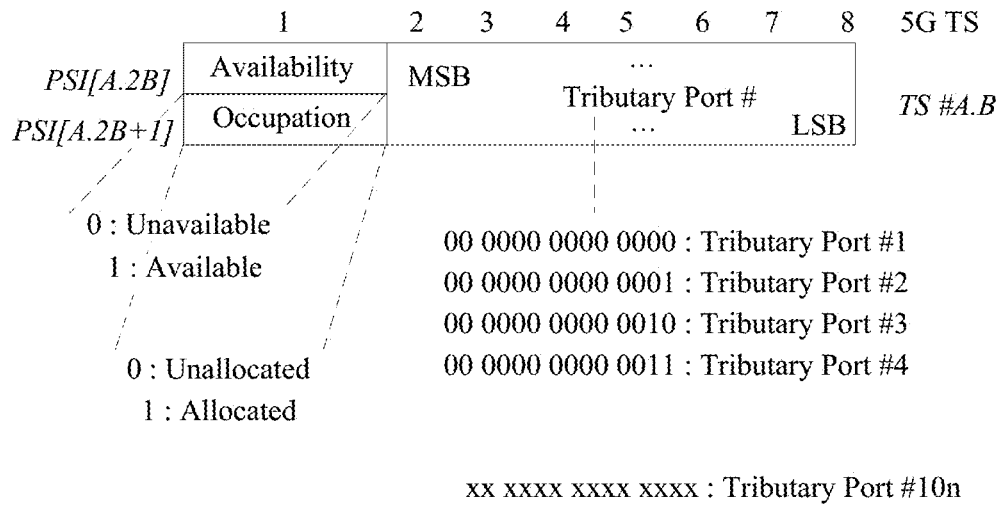
FIG. 8 is a schematic structural diagram of timeslot availability overheads according to an embodiment of the present disclosure.

FIG. 8 is a schematic structural diagram of timeslot availability overheads according to an embodiment of the present disclosure. In a PSI field corresponding to each timeslot, "Availability" indicates whether the timeslot is available. For example, 1 denotes that the timeslot is available, and 0 denotes that the timeslot is unavailable. "Occupation" indicates whether the timeslot is occupied. For example, 1 denotes that the timeslot is occupied, and 0 denotes that the timeslot is unoccupied. The field "Occupation" is meaningful only when the timeslot is available, that is, when "Availability" is 1. "Tributary Port*" indicates a corresponding tributary port number when the timeslot is occupied.

Figure 9:
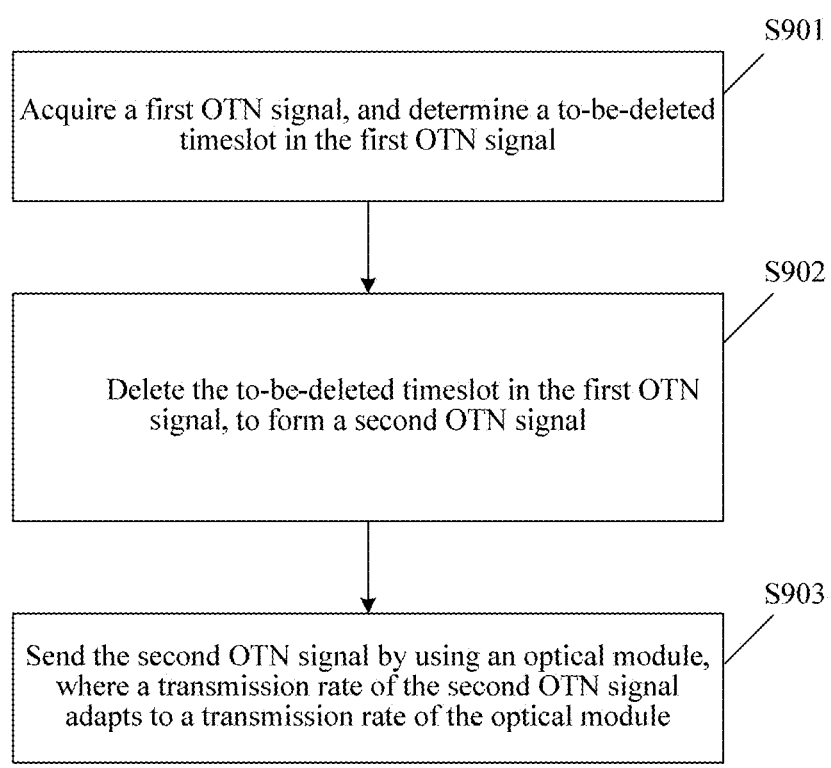
FIG. 9 is an exemplary flowchart of a method for sending an OTN signal according to an embodiment of the present disclosure.

FIG. 9 is an exemplary flowchart of a method for sending an OTN signal according to an embodiment of the present disclosure. The method may be performed by any network element in a network, for example, performed by a Network Element (NE) 1, and the NE 1 may be specifically an SWXC or a WXC. In this embodiment, an example in which an OTUC2 signal (which has a rate of 200 Gbit/s) is converted into an OTUC2-30 signal (which has a rate of 150 Gbit/s) is used for description. Specifically, the OTUCn described in the foregoing embodiment may be an OTUC2, and the OTUCn-M described in the foregoing embodiment may be an OTUC2-30. As shown in FIG. 9, the method may include the following steps.

S901: Acquire a first OTN signal, and determine a to-be-deleted timeslot in the first OTN signal.

In this embodiment, the first OTN signal may be an OTUC2 signal, and the OTUC2 signal has 40 5-Gbit/s timeslots in total. In the sending device NE 1, the OTUC2 signal is converted into an OTUC2-30 signal, and there are 10 to-be-deleted timeslots, that is, 30 5-Gbit/s timeslots are reserved. The first OTN signal may further be either of an ODUC2 signal and an OPUC2 signal.

The determining a to-be-deleted timeslot in the first OTN signal may include the following two methods.

1. The NE 1 receives first timeslot configuration information from a network management system, where the first timeslot configuration information indicates the to-be-deleted timeslot in the first OTN signal; and determines the to-be-deleted timeslot in the first OTN signal according to the first timeslot configuration information.

2. The NE 1 determines the to-be-deleted timeslot in the first OTN signal according to a preset policy, where the preset policy may be an idle timeslot or a reserved timeslot that is set by a system.

In a specific implementation process, after the to-be-deleted timeslot in the first OTN signal is determined, a timeslot deletion identifier may be added to the first OTN signal, and the to-be-deleted timeslot in the first OTN signal is indicated using the timeslot deletion identifier. Specifically, which 10 timeslots need to be deleted is indicated by using timeslot deletion identifiers, or which 30 timeslots do not need to be deleted is indicated by using timeslot deletion identifiers, or which 10 timeslots need to be deleted and which 30 timeslots do not need to be deleted are indicated by using timeslot deletion identifiers.

The timeslot deletion identifier may be implemented by using one bit "Availability" of the timeslot availability overheads shown in FIG. 7 or FIG. 8. When "Availability"=0, it indicates that a timeslot is unavailable and is a to-be-deleted timeslot. When "Availability"=1, it indicates that a timeslot is available, does not need to be deleted, and is a remaining timeslot. Only a to-be-deleted timeslot or a remaining timeslot may further be identified. For example, identification is performed by using only "Availability"=0, or by using only "Availability"=1. A remaining timeslot may further be identified by using "Availability"=0, and a to-be-deleted timeslot may further be identified by using "Availability"=1. The timeslot deletion identifier may further use multiple bits, and a type of the timeslot deletion identifier is not limited thereto.

Optionally, before the timeslot deletion identifier is added to the first OTN signal, the NE 1 may obtain timeslot configuration information from the outside (for example, a network management system) as a basis for addition of the timeslot deletion identifier. Specifically, the NE 1 receives the first timeslot configuration information from the network management system, where the first timeslot configuration information indicates the to-be-deleted timeslot in the first OTN signal; and the NE 1 adds the timeslot deletion identifier to the to-be-deleted timeslot in the first OTN signal according to the first timeslot configuration information.

The first timeslot configuration information obtained by the NE 1 from the network management system may be a Transmitted Multiplex Structure Identifier (TxMSI). The TxMSI may include four pieces of configuration information, such as a timeslot number, a timeslot availability identifier, a timeslot occupation identifier, and a carried tributary service number. A specific format of the TxMSI is shown in Table 2:

TABLE 2

Format of a TxMSI

| Timeslot number TS #A.B | | Timeslot availability | Timeslot occupation | Tributary service number carried |
|---|---|---|---|---|
| A | B | identifier | identifier | by a timeslot |
| 8 bits | 5 bits | 1 bit | 1 bit | 14 bits |
| Denote a number of an OPUC #A multiframe, and have a value of [1, n], where n is a quantity of | Denote a number of a timeslot in an OPUC #A frame, and have a value of [1, 20] | Configure whether a timeslot is available, where 1 denotes that the timeslot is | Configure whether a timeslot carries a tributary service, where 1 denotes that the timeslot carries a tributary service, and 0 | Configure a tributary service number carried by the timeslot |

TABLE 2-continued

Format of a TxMSI

| Timeslot number TS #A.B | | Timeslot availability | Timeslot occupation | Tributary service number carried |
|---|---|---|---|---|
| A | B | identifier | identifier | by a timeslot |
| 8 bits | 5 bits | 1 bit | 1 bit | 14 bits |
| OPUC#A multiframes | | available, and 0 denotes that the timeslot is unavailable | 0 denotes that the timeslot does not carry a tributary service | |

Optionally, the NE 1 may select the to-be-deleted timeslot according to the preset policy, add the timeslot deletion identifier, then report timeslot deletion identifier information to the network management system, and notify the network management system of which timeslots are to-be-deleted timeslots. When selecting the to-be-deleted timeslot according to the preset policy, the NE 1 may select an idle timeslot, or a timeslot or a reserved timeslot that is set by the system.

The NE 1 determines the to-be-deleted timeslot in the first OTN signal, and adds the timeslot deletion identifier to the to-be-deleted timeslot in the first OTN signal; then, the NE 1 generates the timeslot deletion identifier information according to the to-be-deleted timeslot in the first OTN signal, and sends the timeslot deletion identifier information to the network management system.

S902: Delete the to-be-deleted timeslot in the first OTN signal, to form a second OTN signal.

Specifically, the first OTN signal may be any one of an OTUC2 signal, an ODUC2 signal, or an OPUC2 signal. The to-be-deleted timeslot in the first OTN signal may be deleted based on a type of any one of the signals. When the first OTN signal is the OTUC2 signal, the second OTN signal may be an OTUC2-30 signal. When the first OTN signal is the ODUC2 signal, the second OTN signal may be an ODUC2-30 signal or an OTUC2-30 signal. When the first OTN signal is the OPUC2 signal, correspondingly, the second OTN signal may be any one of an OTUC2-30 signal, an ODUC2-30 signal, or an OPUC2-30 signal.

In this embodiment, there may be 10 to-be-deleted timeslots and 30 remaining timeslots. Overheads in the second OTN signal may be all overheads in the first OTN signal, and may further be some overheads in the first OTN signal. For example, the overheads in the first OTN signal may include OTU overheads, FA overheads, ODU overheads, and the like, and may further include timeslot availability overheads. Optionally, the timeslot availability overheads in the first OTN signal, that is, the timeslot deletion identifiers "Availability"=0 and "Availability"=1 in the first OTN signal may not be carried in the second OTN signal. Alternatively, the timeslot deletion identifier "Availability"=0 may not be carried in the second OTN signal.

To more accurately delete the to-be-deleted timeslot, before the to-be-deleted timeslot in the first OTN signal is deleted, the to-be-deleted timeslot in the first OTN signal may be verified according to the timeslot configuration information obtained from the outside (for example, the network management system). Specifically, before deleting the to-be-deleted timeslot in the first OTN signal, the NE 1 receives second timeslot configuration information from the network management system, where the second timeslot configuration information indicates the to-be-deleted timeslot in the first OTN signal. The second timeslot configuration information and the timeslot deletion identifier are verified, and when a verification result is that the second timeslot configuration information is consistent with the timeslot deletion identifier, the to-be-deleted timeslot in the first OTN signal is deleted. When the verification result is that the second timeslot configuration information is inconsistent with the timeslot deletion identifier, a multiplex structure identifier mismatch alarm MSI_MISMATCH is generated, and is reported to the network management system.

The second timeslot configuration information obtained by the NE 1 from the network management system may be an ExMSI (Expected Multiplex Structure Identifier, expected multiplex structure identifier). The ExMSI may include four pieces of configuration information, such as a timeslot number, an availability indication state expected by a timeslot, an occupation indication state expected by a timeslot, and a tributary service number that a timeslot expects to carry. A specific format of the ExMSI is shown in Table 3:

TABLE 3

Format of an ExMSI

| Timeslot number TS #A.B | | Availability indication state expected by a timeslot | Occupation indication state expected by a timeslot | Tributary service number that a timeslot expects to carry |
|---|---|---|---|---|
| 8 bits | 5 bits | 1 bit | 1 bit | 14 bits |
| Denote a number of an OPUC #A multiframe, and have a value of [1, n], where n is | Denote a number of a timeslot in an OPUC #A frame, and have a value of [1, 20] | Configure an availability indication state expected by the timeslot, where 1 denotes that the timeslot expects | Configure a status of carrying a tributary service, which is expected by the timeslot, where 1 denotes that the timeslot | Configure a tributary port number of a tributary service that the timeslot expects to carry, and have a value of |

TABLE 3-continued

Format of an ExMSI

| Timeslot number TS #A.B | Availability indication state expected by a timeslot | Occupation indication state expected by a timeslot | Tributary service number that a timeslot expects to carry |
|---|---|---|---|
| 8 bits          5 bits | 1 bit | 1 bit | 14 bits |
| a quantity of OPUC#A multiframes | to be available, and 0 denotes that the timeslot expects to be unavailable | expects to carry a tributary service, and 0 denotes that the timeslot expects not to carry a tributary service | [1, 10n] |

Optionally, before the to-be-deleted timeslot in the first OTN signal is deleted, the to-be-deleted timeslot may further be directly deleted according to the second timeslot configuration information or the first timeslot configuration information that is from the network management system without adding the timeslot deletion identifier to the first OTN signal. Alternatively, after selecting the to-be-deleted timeslot according to the preset policy, the NE 1 directly deletes the to-be-deleted timeslot without adding the timeslot deletion identifier.

S903: Send the second OTN signal by using an optical module, where a transmission rate of the second OTN signal adapts to a transmission rate of the optical module.

Specifically, the second OTN signal may be an OTUC2-30 signal. When the second OTN signal is the ODUC2-30 signal or the OPUC2-30 signal in S901, the second OTN signal may be first converted into the OTUC2-30 signal, and then may be sent by using the optical module. A manner shown in FIG. 5A, FIG. 5B and FIG. 5C may be used for a structure of an OTUC2-30 frame, and a rate of the OTUC2-30 frame is calculated as 158.1074 Gbit/s, approximately 150 Gbit/s, according to Table 1. A transmission rate of an optical module in the NE 1 is 150 Gbit/s, and adapts to a rate of the OTUC2-30 signal.

In this embodiment of the present disclosure, an NE 1 acquires a first OTN signal, and determines a to-be-deleted timeslot in the first OTN signal; deletes the to-be-deleted timeslot in the first OTN signal, to form a second OTN signal; and sends the second OTN signal by using an optical module, where a transmission rate of the second OTN signal adapts to a transmission rate of the optical module. In this embodiment of the present disclosure, a second OTN signal is constructed based on a timeslot granularity, which has high flexibility, and resolves a problem that a rate of an OTN signal does not adapt to a rate of an optical module.

Figure 10:
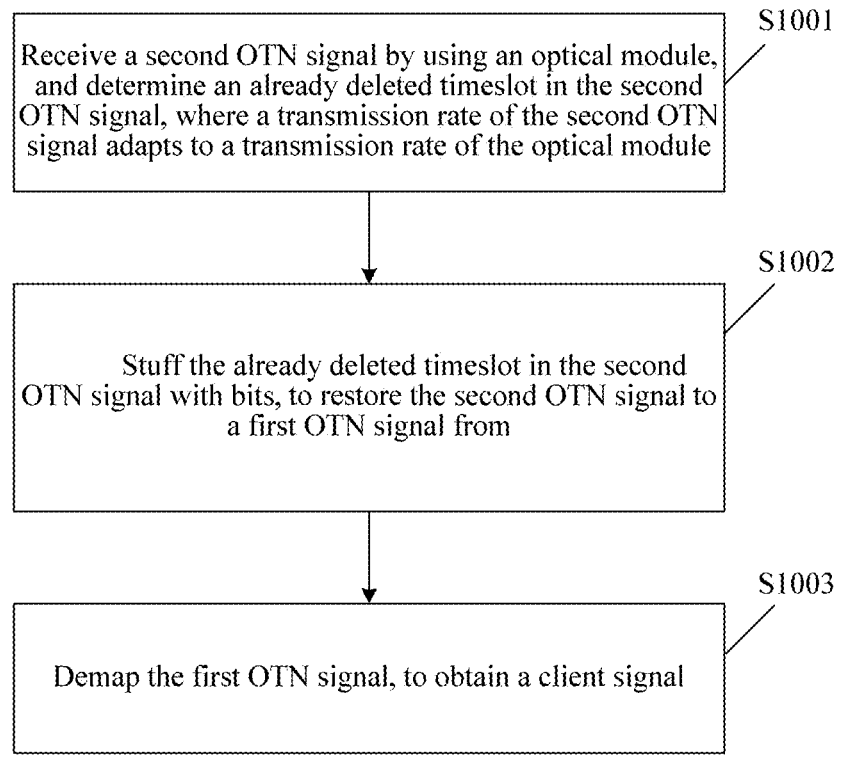
FIG. 10 is an exemplary flowchart of a method for receiving an OTN signal according to an embodiment of the present disclosure.

FIG. 10 is an exemplary flowchart of a method for receiving an OTN signal according to an embodiment of the present disclosure. The method may be performed by any network element, for example, an NE 2, in a network, and the NE 2 may be an SWXC or a WXC. In this embodiment, an example in which an OTUC2-30 signal (which has a rate of 150 Gbit/s) is converted into an OTUC2 signal (which has a rate of 200 Gbit/s) is used for description. Specifically, the OTUCn described in the foregoing embodiment may be an OTUC2, and the OTUCn-M described in the foregoing embodiment may be an OTUC2-30. As shown in FIG. 10, the method may include the following steps.

S1001: Receive a second OTN signal using an optical module, and determine an already deleted timeslot in the second OTN signal, where a transmission rate of the second OTN signal adapts to a transmission rate of the optical module.

In this embodiment, the second OTN signal may be an OTUC2-30 signal, and the OTUC2-30 signal has 30 5-Gbit/s timeslots in total. In the receiving device NE 2, an OTUC2 signal is restored from the OTUC2-30 signal, and there are 10 deleted timeslots in the OTUC2-30 signal. A transmission rate of the OTUC2-30 signal is 150 Gbit/s, and a transmission rate of an optical module in the NE 2 is 150 Gbit/s. The transmission rate of the OTUC2-30 signal adapts to the transmission rate of the optical module. The second OTN signal may further be specifically either of an ODUC2-30 signal and an OPUC2-30 signal.

In a specific implementation process, a timeslot deletion identifier may be acquired from timeslot availability overheads of the second OTN signal, where the timeslot deletion identifier indicates the already deleted timeslot in the second OTN signal. The NE 2 determines the already deleted timeslot in the second OTN signal according to the timeslot deletion identifier. Specifically, which 10 timeslots are already deleted is determined by using timeslot deletion identifiers, or which 30 timeslots are not deleted is determined by using timeslot deletion identifiers, or which 10 timeslots are already deleted and which 30 timeslots are not deleted are determined by using timeslot deletion identifiers.

A method for denoting the timeslot deletion identifier in overheads of the second OTN signal is already described in detail in the embodiment shown in FIG. 9, and is not described herein.

Optionally, when the second OTN signal does not carry the timeslot deletion identifier, the NE 2 may determine the already deleted timeslot in the second OTN signal according to timeslot configuration information acquired from the outside (for example, a network management system). Specifically, the NE 2 receives first timeslot configuration information from the network management system, where the first timeslot configuration information indicates the already deleted timeslot in the second OTN signal; and determines the already deleted timeslot in the second OTN signal according to the first timeslot configuration information.

Further, when the second OTN signal does not carry the timeslot deletion identifier, the NE 2 may further add the timeslot deletion identifier to the second OTN signal according to the first timeslot configuration information.

The first timeslot configuration information obtained by the NE 2 from the network management system may be a TxMSI. A specific format of the TxMSI is already described in detail in the embodiment shown in FIG. 9, and is not described herein.

S1002: Stuff the already deleted timeslot in the second OTN signal with bits, to restore the second OTN signal to a first OTN signal.

Specifically, the second OTN signal may be any one of an OTUC2-30 signal, an ODUC2-30 signal, or an OPUC2-30 signal. The already deleted timeslot in the second OTN signal may be stuffed with bits based on a type of any one of the signals. When the second OTN signal is the OTUC2-30 signal, the first OTN signal may be any one of an OTUC2 signal, an ODUC2 signal, or an OPUC2 signal. When the second OTN signal is the ODUC2-30 signal, the first OTN signal may be either of an ODUC2 signal and an OPUC2 signal. When the second OTN signal is the OPUC2-30 signal, the first OTN signal may be an OPUC2 signal.

After determining the already deleted timeslot in the first OTN signal, the NE 2 may stuff the already deleted timeslot with 0, so that the second OTN signal is restored from the first OTN signal. To more accurately identify the already deleted timeslot, before the already deleted timeslot in the second OTN signal is stuffed with bits, the already deleted timeslot in the second OTN signal may be verified according to timeslot configuration information obtained from the outside (for example, a network management system). Specifically, before stuffing the already deleted timeslot in the second OTN signal with bits, the NE 2 receives second timeslot configuration information from the network management system, where the second timeslot configuration information indicates the already deleted timeslot in the second OTN signal. The second timeslot configuration information and the timeslot deletion identifier are verified, and when a verification result is that the second timeslot configuration information is consistent with the timeslot deletion identifier, the already deleted timeslot in the second OTN signal is stuffed with bits. When the verification result is that the second timeslot configuration information is inconsistent with the timeslot deletion identifier, a multiplex structure identifier mismatch alarm MSI_MISMATCH is generated, and is reported to the network management system.

The second timeslot configuration information obtained by the NE 2 from the network management system may be an ExMSI. A specific format of the ExMSI is already described in detail in the embodiment shown in FIG. 9, and is not described herein.

S1003: Demap the first OTN signal, to obtain a client signal.

Specifically, the client signal may be obtained by demapping remaining timeslots other than the already deleted timeslot indicated by the timeslot deletion identifier. Alternatively, remaining timeslots other than the already deleted timeslot indicated by the timeslot configuration information (for example, the TxMSI and/or the ExMSI) may be demapped, to obtain the client signal. All timeslots in the first OTN signal may further be demapped, to obtain the client signal.

Optionally, the first OTN signal may not be restored from the second OTN signal, and all timeslots of the second OTN signal are directly demapped, to obtain the client signal.

In this embodiment of the present disclosure, an NE 2 receives a second OTN signal by using an optical module, and determines an already deleted timeslot in the second OTN signal, where a transmission rate of the second OTN signal adapts to a transmission rate of the optical module; stuffs the already deleted timeslot in the second OTN signal with bits, to restore the second OTN signal to a first OTN signal; and demaps the first OTN signal, to obtain a client signal. The first OTN signal is restored from the second OTN signal, and a framing processing chip does not need to be re-designed, which has low implementation complexity. In addition, a problem that a rate of an OTN signal does not adapt to a rate of an optical module is resolved.

Figure 11:
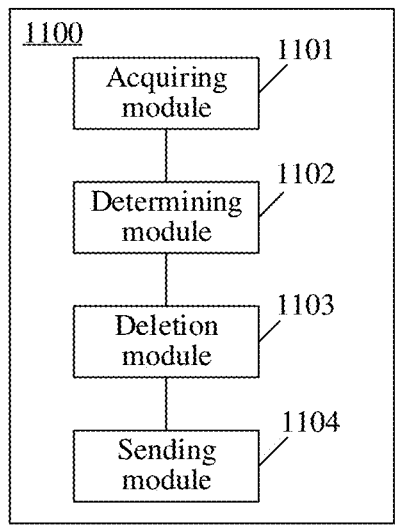
FIG. 11 is a schematic structural diagram of an OTN device 1100 according to an embodiment of the present disclosure.

FIG. 11 is a schematic structural diagram of an OTN device 1100 according to an embodiment of the present disclosure. The OTN device 1100 may be an SWXC or a WXC. As shown in FIG. 11, the OTN device 1100 may include: an acquiring module 1101, a determining module 1102, a deletion module 1103, and a sending module 1104. The OTN device 1100 may perform the steps of the method in the embodiment shown in FIG. 9 or FIG. 10.

Specifically, the acquiring module 1101 is configured to acquire a first OTN signal. The determining module 1102 is configured to determine a to-be-deleted timeslot in the first OTN signal. The deletion module 1103 is configured to delete the to-be-deleted timeslot in the first OTN signal, to form a second OTN signal. The sending module 1104 is configured to send the second OTN signal by using an optical module, where a transmission rate of the second OTN signal adapts to a transmission rate of the optical module.

The OTN device 1100 further includes an addition module, configured to add a timeslot deletion identifier to the first OTN signal, where the timeslot deletion identifier indicates the to-be-deleted timeslot in the first OTN signal.

The OTN device 1100 further includes a verification module, configured to: receive second timeslot configuration information from a network management system, where the second timeslot configuration information indicates the to-be-deleted timeslot in the first OTN signal; and verify the second timeslot configuration information and the timeslot deletion identifier, and when a verification result is that the second timeslot configuration information is consistent with the timeslot deletion identifier, delete the to-be-deleted timeslot in the first OTN signal.

In this embodiment of the present disclosure, the OTN device acquires a first OTN signal, and determines a to-be-deleted timeslot in the first OTN signal; deletes the to-be-deleted timeslot in the first OTN signal, where remaining timeslots in the first OTN signal and overheads in the first OTN signal construct a second OTN signal; and sends the second OTN signal by using an optical module, where a transmission rate of the second OTN signal adapts to a transmission rate of the optical module. In this embodiment of the present disclosure, a second OTN signal is constructed based on a timeslot granularity, which has high flexibility, and resolves a problem that a rate of an OTN signal does not adapt to a rate of an optical module.

Figure 12:
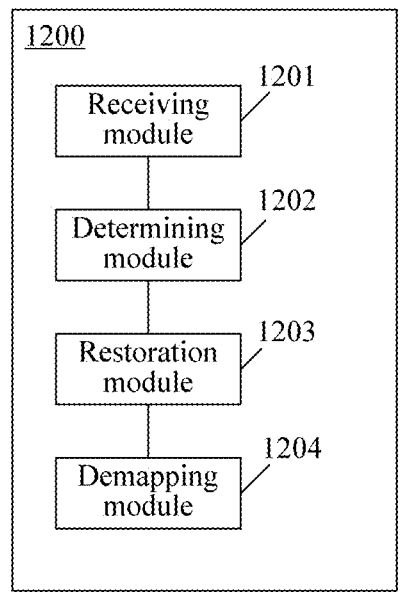
FIG. 12 is a schematic structural diagram of an OTN device 1200 according to an embodiment of the present disclosure.

FIG. 12 is a schematic structural diagram of an OTN device 1200 according to an embodiment of the present disclosure. The OTN device 1200 may be an SWXC or a WXC. As shown in FIG. 12, the OTN device 1200 may include: a receiving module 1201, a determining module 1202, a restoration module 1203, and a demapping module 1204. The OTN device 1200 may perform the steps of the method in the embodiment shown in FIG. 9 or FIG. 10.

Specifically, the receiving module 1201 is configured to receive a second OTN signal by using an optical module, where a transmission rate of the second OTN signal adapts to a transmission rate of the optical module; the determining module 1202 is configured to determine an already deleted timeslot in the second OTN signal; the restoration module 1203 is configured to stuff the already deleted timeslot in the second OTN signal with bits, to restore the second OTN signal to a first OTN signal; and the demapping module 1204 is configured to demap the first OTN signal, to obtain a client signal.

The determining module 1202 is specifically configured to acquire a timeslot deletion identifier in overheads of the second OTN signal, where the timeslot deletion identifier indicates the already deleted timeslot in the second OTN signal; and determine the already deleted timeslot in the second OTN signal according to the timeslot deletion identifier.

The OTN device further includes a verification module, configured to: receive second timeslot configuration information from a network management system, where the second timeslot configuration information indicates the already deleted timeslot in the second OTN signal; and verify the second timeslot configuration information and the timeslot deletion identifier, and when a verification result is that the second timeslot configuration information is consistent with the timeslot deletion identifier, stuff the already deleted timeslot in the second OTN signal with bits.

In this embodiment of the present disclosure, the OTN device receives a second OTN signal by using an optical module, and determines an already deleted timeslot in the second OTN signal, where a transmission rate of the second OTN signal adapts to a transmission rate of the optical module; stuffs the already deleted timeslot in the second OTN signal with bits, to restore the second OTN signal to a first OTN signal; and demaps the first OTN signal, to obtain a client signal. The first OTN signal is restored from the second OTN signal, and a framing processing chip does not need to be re-designed, which has low implementation complexity. In addition, a problem that a rate of an OTN signal does not adapt to a rate of an optical module is resolved.

Figure 13:
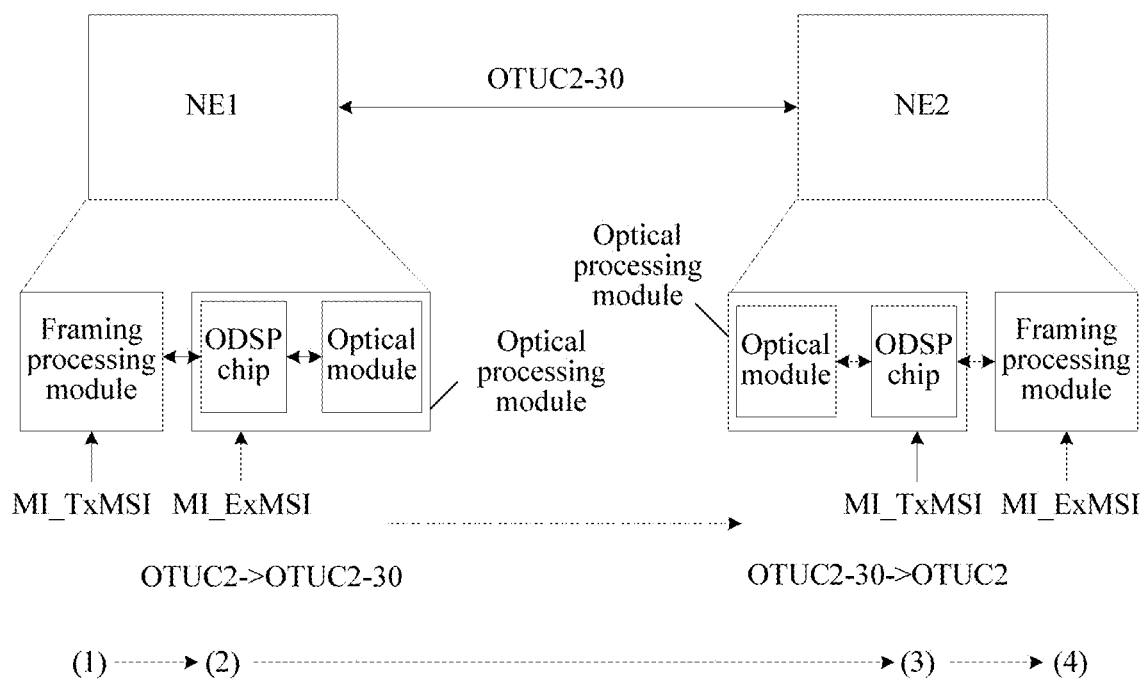
FIG. 13 is a schematic structural diagram of a system for sending and receiving an OTN signal according to an embodiment of the present disclosure.

FIG. 13 is a schematic structural diagram of a system for sending and receiving an OTN signal according to an embodiment of the present disclosure. An NE 1 and an NE 2 may be SWXCs. An SWXC has a sub-wavelength cross function, that is, a small granularity cross function at an electrical layer of an OTN. A specific structure and functions of the SWXC are described in detail in the embodiment shown in FIG. 3. In this embodiment, there is no intermediate node between the NE 1 and the NE 2, and it is assumed that the NE 1 and the NE 2 both use an optical module having a transmission rate of 150 Gbit/s for interconnection. In this embodiment of the present disclosure, when an OTUC2 signal having a rate of 200 Gbit/s is sent on the NE 1 by using the optical module having a rate of 150 Gbit/s, the rate of the OTUC2 signal needs to be adjusted to 150 Gbit/s, to adapt to the rate of the optical module. Specifically, the OTUC2 is converted into an OTUC2-30 signal having a rate of 150 Gbit/s, to adapt to the transmission rate of the optical module.

Each of a framing processing module and an optical processing module of each of the NE 1 and the NE 2 separately has a transmit end and a receive end. When a signal is transmitted in a direction from a mark (1) to a mark (4), the mark (1) denotes the transmit end of the framing processing module of the NE 1, a mark (2) denotes the receive end of the optical processing module of the NE 1, a mark (3) denotes the transmit end of the optical processing module of the NE 2, and the mark (4) denotes the receive end of the framing processing module of the NE 2. In a specific implementation process, at the mark (1), the framing processing module of the NE 1 determines a to-be-deleted timeslot in the OTUC2 signal according to outside timeslot configuration information Multiplex Identifier Transmitted Multiplex Structure Identifier (MI_T×MSI). At the mark (2), an ODSP chip in the optical processing module of the NE 1 verifies the to-be-deleted timeslot in the OTUC2 signal according to outside timeslot configuration information Multiplex Identifier Expected Multiplex Structure Identifier (MI_E×MSI), and deletes the to-be-deleted timeslot, to construct an OTUC2-30 signal. At the mark (3), an ODSP chip of the optical processing module of the NE 2 determines an already deleted timeslot in the OTUC2-30 signal according to the outside timeslot configuration information MI_T×MSI. At the mark (4), the framing processing module of the NE 2 verifies the already deleted timeslot in the OTUC2-30 signal according to the outside timeslot configuration information MI_E×MSI, and stuffs the already deleted timeslot with bits, to restore the OTUC2-30 signal to the OTUC2 signal.

Steps of the methods of the embodiments shown in FIG. 9 and FIG. 10 may be implemented by the system.

Specifically, S901 may be performed by the mark (1), and S902 and S903 may be performed by the mark (2). Specifically, the "determining a to-be-deleted timeslot in the first OTN signal" in S901 may be performed by the mark (1), or may be performed by the mark (2). Alternatively, S901 and S902 may be performed by the mark (1), and S903 may be performed by the mark (2).

S1001 may be performed by the mark (3), and S1002 and S1003 may be performed by the mark (4). Specifically, the "determining an already deleted timeslot in the second OTN signal" in Slow may be performed by the mark (3), or may be performed by the mark (4). Alternatively, S1001 and S1002 may be performed by the mark (3), and S1003 may be performed by the mark (4).

In this embodiment of the present disclosure, on an NE 1, a to-be-deleted timeslot in an OTUC2 signal is deleted, and the OTUC2 signal is converted into an OTUC2-30 signal; on an NE 2, an already deleted timeslot in the OTUC2-30 signal is stuffed with bits, the OTUC2 signal is restored from the OTUC2-30 signal, and the OTUC2 signal is demapped, to obtain a client signal. An OTUC2-30 signal is constructed based on a timeslot granularity, which has high flexibility, and resolves a problem that a rate of an OTN signal does not adapt to a rate of an optical module.

Figure 14:
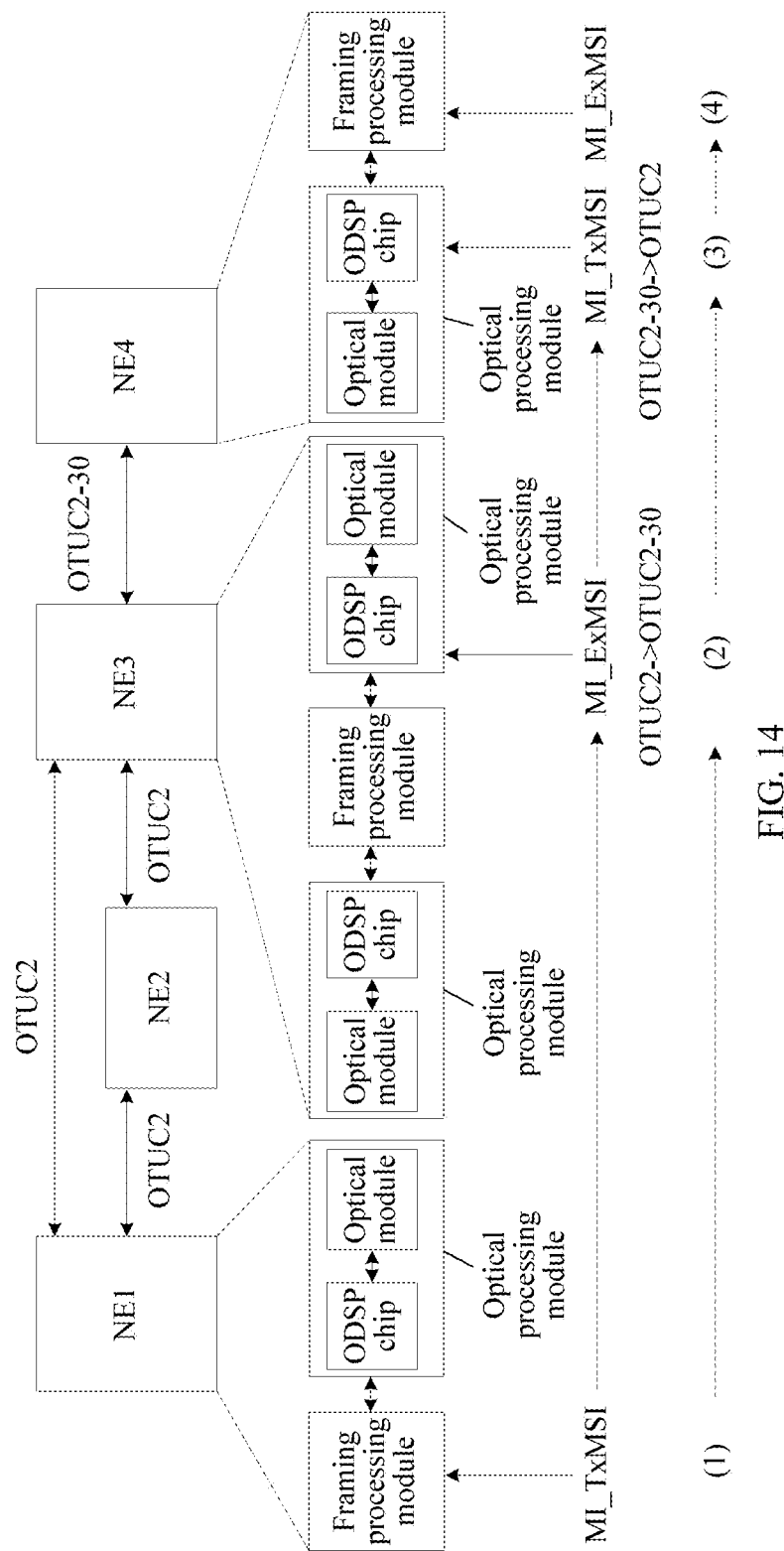
FIG. 14 is a schematic structural diagram of a system for sending and receiving an OTN signal according to an embodiment of the present disclosure.

FIG. 14 is a schematic structural diagram of a system for sending and receiving an OTN signal according to an embodiment of the present disclosure. An NE 1 and an NE 4 may be SWXCs. An SWXC has a sub-wavelength cross function, that is, a small granularity cross function at an electrical layer of an OTN. A specific structure and functions of the SWXC are described in detail in the embodiment shown in FIG. 3. An NE 2 may be a WXC, and the WXC has a wavelength cross function, and processes only an optical signal. An NE 3 may be a WXC or a 3R, which has a wavelength cross function, and can regenerate an electrical signal. For example, the NE 3 may terminate a received OTUCn signal, parse out an ODUCn signal, and then encapsulate the ODUCn signal into a regenerated OTUCn signal for sending. A specific structure and functions of the WXC or the 3R generator are described in detail in the embodiment shown in FIG. 4. There is an intermediate node, such as the NE 2 or the NE 3, between the NE 1 and the NE 4. The NE 1 and the NE 4 may be connected by using the NE 2 and the NE 3. The NE 1 is interconnected to the NE 2 and the NE 2 is interconnected to the NE 3 by using an optical module having a transmission rate of 200 Gbit/s, and the NE 3 is interconnected to the NE 4 by using an optical module having a transmission rate of 150 Gbit/s. Alternatively, the NE 1 is connected to the NE 4 by using the NE 3. The NE 1 is interconnected to the NE 3 by using an optical module having a transmission rate of 200 Gbit/s, and the NE 3 is interconnected to the NE 4 by using an optical module having a transmission rate of 150 Gbit/s. In this embodiment of the present disclosure, an OTUC2 signal having a rate of 200 Gbit/s is sent on the NE 1, and the OTUC2 signal is transmitted between the NE 1, the NE 2, and the NE 3. Alternatively, the OTUC2 signal is transmitted between the NE 1 and the NE 3. When the OTUC2 signal is sent from the NE 3 to the NE 4, the optical module for interconnecting the NE 3 and the NE 4 has a rate of 150 Gbit/s. Therefore, the rate of the OTUC2 signal needs to be adjusted to 150 Gbit/s, to adapt to the rate of the optical module. Specifically, the OTUC2 signal is converted into an OTUC2-30 signal having a rate of 150 Gbit/s, to adapt to the transmission rate of the optical module.

Steps of the methods of the embodiments shown in FIG. 9 and FIG. 10 may be implemented by the system.

Specifically, steps performed at marks (1), (2), (3), and (4) are similar to the steps performed at the marks (1), (2), (3), and (4) in the embodiment shown in FIG. 13, but steps performed at the marks (1) and (2) are respectively implemented on the NE 1 and the NE 3.

In this embodiment of the present disclosure, on an NE 1, a to-be-deleted timeslot in an OTUC2 signal is determined; on an intermediate node NE 3, the to-be-deleted timeslot determined by the NE 1 is deleted, and the OTUC2 signal is converted into an OTUC2-30 signal; on an NE 2, an already deleted timeslot in the OTUC2-30 signal is stuffed with bits, the OTUC2 signal is restored from the OTUC2-30 signal, and the OTUC2 signal is demapped, to obtain a client signal. An OTUC2-30 signal is constructed based on a timeslot granularity, which has high flexibility, and resolves a problem that a rate of an OTN signal does not adapt to a rate of an optical module.

A person of ordinary skill in the art may understand that, each aspect of the present disclosure or a possible implementation manner of each aspect may be specifically implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing are merely some embodiments of the present disclosure. A person skilled in the art may make various modifications and variations to the present disclosure without departing from the spirit and scope of the present disclosure.

What is claimed is:

1. A method, comprising:
   acquiring a first optical transport network (OTN) signal, wherein the first OTN signal has a first transmission rate;
   constructing a second OTN signal using a subset of timeslots in the first OTN signal, wherein the second OTN signal has a second transmission rate equal to the first transmission rate multiplied by $(10*n+119*M)/(10*n+119*20n)$, 20n is a quantity of timeslots in the first OTN signal, M is a quantity of timeslots in the second OTN signal, n and M are positive integers, and M is smaller than 20n; and
   sending the second OTN signal using an optical transceiver.

2. The method according to claim 1, wherein the method further comprises:
   adding a timeslot deletion identifier to the first OTN signal, wherein the timeslot deletion identifier indicates one or more to-be-deleted timeslots in the first OTN signal, and the one or more to-be-deleted timeslots are timeslots that will be deleted when constructing the second OTN signal, to cause the second OTN signal to have the second transmission rate.

3. The method according to claim 2, wherein before constructing the second OTN signal, the method further comprises:
   receiving second timeslot configuration information from a network management system, wherein the second timeslot configuration information indicates the one or more to-be-deleted timeslots in the first OTN signal; and verifying whether a verification result is that the second timeslot configuration information is consistent with the timeslot deletion identifier.

4. The method according to claim 2, wherein after constructing the second OTN signal, the method further comprises:
generating timeslot deletion identifier information according to the one or more to-be-deleted timeslots in the first OTN signal, wherein the timeslot deletion identifier information indicates the one or more to-be-deleted timeslots in the first OTN signal; and
sending the timeslot deletion identifier information to a network management system.

5. The method according to claim 1, wherein the method further comprises:
receiving first timeslot configuration information from a network management system, wherein the first timeslot configuration information indicates one or more to-be-deleted timeslots in the first OTN signal, and one or more to-be-deleted timeslots are timeslots that will be deleted when constructing the second OTN signal, to cause the second OTN signal to have the second transmission rate; and
wherein constructing the second OTN signal comprises:
constructing the second OTN signal using the subset of timeslots in the first OTN signal according to the first timeslot configuration information.

6. The method according to claim 1, wherein constructing the second OTN signal comprises:
constructing the second OTN signal according to a preset policy.

7. The method according to claim 1, wherein the first OTN signal is an Optical Channel Transport Unit-Cn (OTUCn) signal.

8. An optical transport network (OTN) device, comprising:
a transceiver, configured to receive a first OTN signal, wherein the first OTN signal has a first transmission rate; and
a processor coupled with the transceiver, the processor being configured to:
construct a second OTN signal using a subset of timeslots in the first OTN signal, wherein the second OTN signal has a second transmission rate equal to the first transmission rate multiplied by $(10*n+119*M)/(10*n+119*20n)$, 20n is a quantity of timeslots in the first OTN signal and M is a quantity of timeslots in the second OTN signal, n and M are positive integers, and M is smaller than 20n; and
wherein the transceiver is further configured transmit the second OTN signal using an optical transceiver.

9. The OTN device according to claim 8, wherein the processor is further configured to add a timeslot deletion identifier to the first OTN signal, wherein the timeslot deletion identifier indicates one or more to-be-deleted timeslots in the first OTN signal, and the one or more to-be-deleted timeslots are timeslots that will be deleted when constructing the second OTN signal, to cause the second OTN signal to have the second transmission rate.

10. The OTN device according to claim 9, wherein the processor is further configured to:
receive second timeslot configuration information from a network management system, wherein the second timeslot configuration information indicates the one or more to-be-deleted timeslots in the first OTN signal; and
verify whether a verification result is that the second timeslot configuration information is consistent with the timeslot deletion identifier.

11. The OTN device according to claim 8, wherein the processor is further configured to:
receive first timeslot configuration information from a network management system, wherein the first timeslot configuration information indicates one or more to-be-deleted timeslots in the first OTN signal, and the one or more to-be-deleted timeslots are timeslots that will be deleted when constructing the second OTN signal, to cause the second OTN signal to have the second transmission rate; and
wherein constructing the second OTN signal comprises:
constructing the second OTN signal using the subset of timeslots in the first OTN signal according to the first timeslot configuration information.

12. The OTN device according to claim 8, wherein constructing the second OTN signal comprises:
constructing the second OTN signal according to a preset policy.

13. The OTN device according to claim 9, wherein the processor is further configured to:
generate timeslot deletion identifier information according to the one or more to-be-deleted timeslots in the first OTN signal, wherein the timeslot deletion identifier information indicates the one or more to-be-deleted timeslots in the first OTN signal; and
send the timeslot deletion identifier information to a network management system.

14. An optical transport network (OTN) device, comprising:
a transceiver, configured to receive a second OTN signal using an optical transceiver, wherein the second OTN signal has a first transmission rate that corresponds to a transmission rate of the optical transceiver; and
a processor, configured to:
restore a first OTN signal from the second OTN signal, wherein a rate of the first OTN signal is equal to the first transmission rate divided by $(10*n+119*M)/(10*n+119*20n)$, 20n is a quantity of timeslots in the first OTN signal, M is a quantity of timeslots in the second OTN signal, n and M are positive integers, and M is smaller than 20n; and
demap the first OTN signal, to obtain a client signal.

15. The OTN device according to claim 14, wherein the processor is further configured to:
acquire a timeslot deletion identifier from the second OTN signal, wherein the timeslot deletion identifier indicates a previously deleted timeslot in the second OTN signal; and
determine the previously deleted timeslot in the second OTN signal according to the timeslot deletion identifier.

16. The OTN device according to claim 15, wherein the processor is further configured to:
receive second timeslot configuration information from a network management system, wherein the second timeslot configuration information indicates the previously deleted timeslot in the second OTN signal; and
verify whether a verification result is that the second timeslot configuration information is consistent with the timeslot deletion identifier.

17. The OTN device according to claim 16, wherein demapping the first OTN signal, to obtain the client signal, comprises:

demapping timeslots in the first OTN signal other than the previously deleted timeslot, to obtain the client signal.

18. The OTN device according to claim 14, wherein restoring the first OTN signal comprises:
   receiving first timeslot configuration information from a network management system, wherein the first timeslot configuration information indicates a previously deleted timeslot in the second OTN signal; and
   restoring the first OTN signal from the second OTN signal according to the first timeslot configuration information.

* * * * *

UNITED STATES PATENT AND TRADEMARK OFFICE
CERTIFICATE OF CORRECTION

PATENT NO. : 10,771,178 B2
APPLICATION NO. : 15/934067
DATED : September 8, 2020
INVENTOR(S) : Wei Su et al.

Page 1 of 1

It is certified that error appears in the above-identified patent and that said Letters Patent is hereby corrected as shown below:

In the Claims

In Column 25, Line 20, Claim 5, delete "and one" and insert --and the one--.

Signed and Sealed this
First Day of December, 2020

Andrei Iancu
*Director of the United States Patent and Trademark Office*